(12) United States Patent
Hrcka et al.

(10) Patent No.: US 9,092,909 B2
(45) Date of Patent: Jul. 28, 2015

(54) MATCHING A SYSTEM CALCULATION SCALE TO A PHYSICAL OBJECT SCALE

(71) Applicant: Autodesk, Inc., San Rafael, CA (US)

(72) Inventors: Michal Hrcka, Decin (CZ); Lance Wilson Grow, Tigard, OR (US); David Obergries, Jilove (CZ)

(73) Assignee: Autodesk, Inc., San Rafael, CA (US)

( * ) Notice: Subject to any disclaimer, the term of this patent is extended or adjusted under 35 U.S.C. 154(b) by 234 days.

(21) Appl. No.: 13/755,866

(22) Filed: Jan. 31, 2013

(65) Prior Publication Data

US 2013/0194257 A1 Aug. 1, 2013

Related U.S. Application Data

(60) Provisional application No. 61/592,972, filed on Jan. 31, 2012.

(51) Int. Cl.
  *G06T 15/00* (2011.01)
  *G06T 11/60* (2006.01)
  *G06T 19/20* (2011.01)
  *G06T 19/00* (2011.01)
  *G06F 17/50* (2006.01)

(52) U.S. Cl.
  CPC ............ *G06T 11/60* (2013.01); *G06F 17/5004* (2013.01); *G06T 19/006* (2013.01); *G06T 19/20* (2013.01); *G06T 2219/2016* (2013.01)

(58) Field of Classification Search
  CPC . G06T 11/60; G06T 19/20; G06T 2219/2016; G06T 19/006; G06F 17/5004
  USPC .................. 345/419, 418, 587; 382/154, 293; 701/409, 25, 28
  See application file for complete search history.

(56) References Cited

U.S. PATENT DOCUMENTS 8,270,769 B2 * 9/2012 Judelson ........................ 382/293
8,594,930 B2 * 11/2013 Mays et al. .................... 701/454

* cited by examiner

*Primary Examiner* — Phu K Nguyen
(74) *Attorney, Agent, or Firm* — Gates & Cooper LLP (57) ABSTRACT

A method, apparatus, system, article of manufacture, and computer readable storage medium provide the ability to scale a diagram. An image is selected and utilized as a background image. Full geometry is obtained and is displayed with the background image. The full geometry is a first geometry and remaining second geometry. The first geometry is selected and a reference length for the selected first geometry is specified. The remaining second geometry is in the diagram is scaled based on the specified reference length.

20 Claims, 6 Drawing Sheets

MATCHING A SYSTEM CALCULATION SCALE TO A PHYSICAL OBJECT SCALE

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/592,972, filed on Jan. 31, 2012, by Michal Hrcka and Lance Wilson Grow, and David Obergries, entitled "Matching a System Calculation Scale to a Physical Object Scale".

This application is related to the following co-pending and commonly-assigned patent applications, which applications are incorporated by reference herein:

U.S. patent application Ser. No. 13/755,882, entitled "GRAPH BASED DEGREE OF FREEDOM COUNTER FOR TWO DIMENSIONAL DRAWINGS", filed on the same date herewith by Michal Hrcka, and Lance Wilson Grow, which application claims priority to Provisional Application Ser. No. 61/592,960, filed on Jan. 31, 2012, by Michal Hrcka and Lance Wilson Grow, entitled "Graph Based Degree of Freedom Counter for Two Dimensional Drawings,"; and U.S. patent application Ser. No. 13/755,833, filed on the same date herewith, entitled "CREATING A SYSTEM EQUILIBRIUM VIA UNKNOWN FORCE(S)", by Lance Wilson Grow, Zdenek Slavik, and Jirka Stejskal, which application claims priority to U.S. Provisional Patent Application Ser. No. 61/592,977, filed on Jan. 31, 2012, entitled "CREATING A SYSTEM EQUILIBRIUM VIA UNKNOWN FORCE(S)", by Lance Grow, Zdenek Slavik, and Jirka Stejskal.

BACKGROUND OF THE INVENTION

1. Field of the Invention

The present invention relates generally to mechanical and civil engineering, and in particular, to a method, apparatus, and article of manufacture for easily scaling a drawing based on a real world image.

2. Description of the Related Art

Engineers often design solutions that are integrated with an existing system/design. To perform the integration, the engineer often must re-create an existing system in a computer aided design (CAD) application. Once in electronic form, extensive precise measurements of the real world system must be made (for all of the various parts of the existing real world system) in order to properly scale the CAD design. Such a recreation and scaling is cumbersome and fails to take advantage of features available in modern day portable computing devices (e.g., tablet devices, mobile phones, etc.). To better understand these problems, a description of two different exemplary scenarios may be useful.

In the first scenario, an engineer needs to run a conceptual simulation for the rough sizing of a custom crane built on an existing tug boat. To run the simulation in the prior art, the engineer would need to get drawings of the tug boat, gather reference imagery and measurements, and often still have to visit the boat's actual location to take notes and verify the size and position of key points on the deck of the boat. To start roughing out the crane design, the engineer would then have to re-create the boat layout in a CAD system. An engineer will typically only know a few key functional constraints on the design at this point beyond the mounting details on the boat itself. The engineer might also know the operational length required for the boom and the cranes working loads. Once the engineer has drawn the layout of the boat in the CAD system, the next step is to start sketching in elements of the crane design to rough out sizing. This is primarily done using free body diagrams (statics) to see how long the crane arm can be under the working load without capsizing the boat. There are several other questions the engineer will also answer at this stage of the concept using static simulations. This design stage often requires multiple visits to a customer's location to share details and iterate on the design to meet the customer's needs.

In a second scenario, an engineer wants to analyze an existing mechanism as a potential solution for a new design. It is very typical for an engineer to take advantage of existing well proven mechanisms to solve new problems. In this regard, the engineer may know of a similar mechanism used in a different application that could be a potential solution for the new/current problem. Alternatively, the engineer may have seen a mechanism detailed in a text book or mechanical engineering design book that the engineer desires to replicate and analyze. To replicate an existing design/mechanism in the prior art requires an engineer to effectively re-draw the system from scratch using CAD tools. Thereafter, a calculator, pencil and paper may be used to run a static analysis. If the engineer desires to modify the geometry, all of the calculations must be manually re-run. Such a manual recreation and re-run is not a very efficient process.

In view of the above, what is needed is an easy and efficient mechanism/technique for utilizing an existing design/solution that does not require that an engineer perform numerous manual measurements and calculations.

SUMMARY OF THE INVENTION

One or more embodiments of the invention overcome the problems of the prior art by leveraging the native hardware on any camera enabled mobile device. An image of an item to be designed is captured or obtained (e.g., using a camera or obtained from a gallery created by such a camera or received in the device) and used as a background image for a free body diagram. One object in the photograph is measured, and used as a reference scaling line, and the remaining elements in the free body diagram are then automatically scaled based on this reference.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
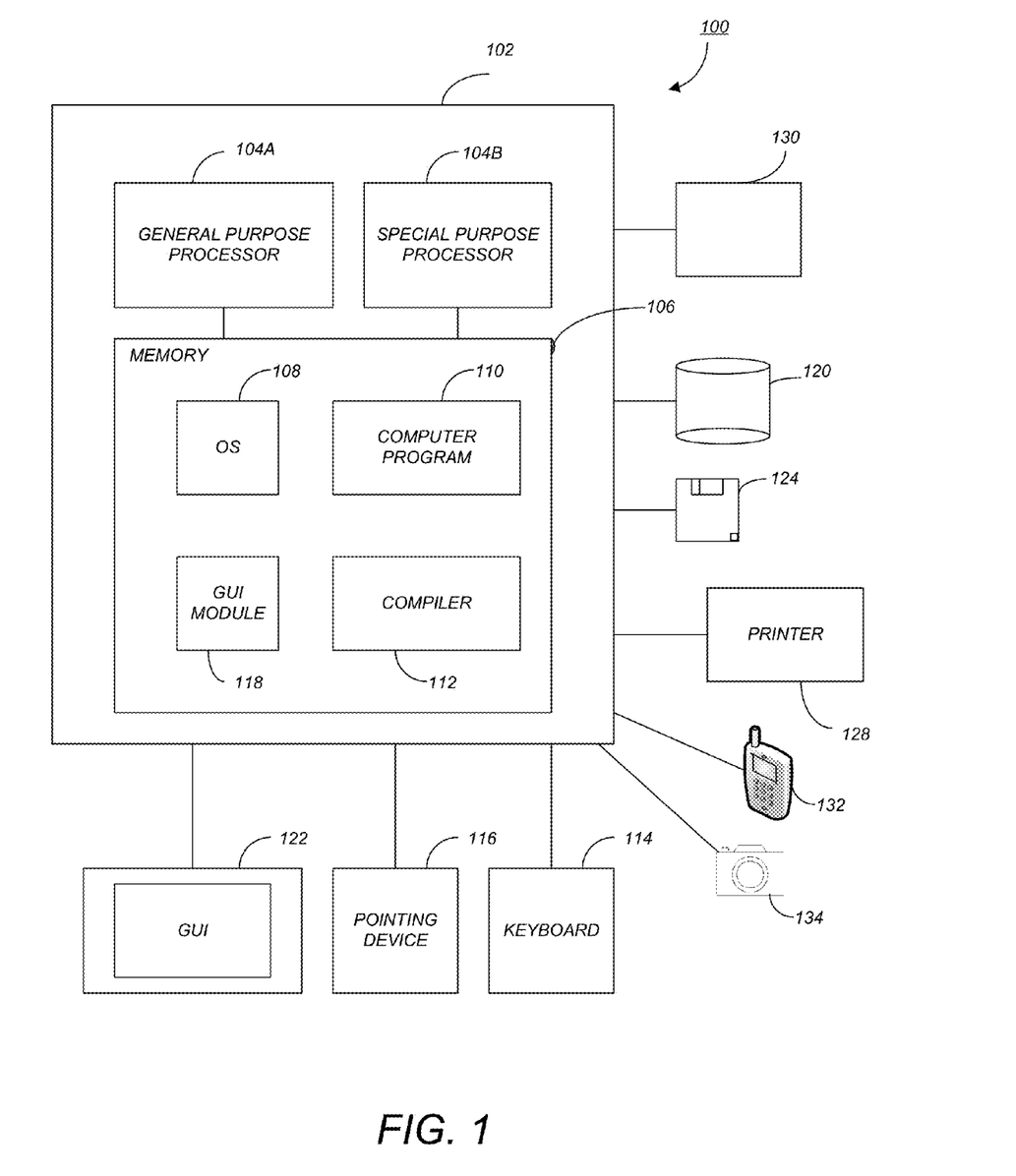
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to and/or integrated with other devices, including input/output (I/O) devices such as a keyboard 114, a cursor control device 116 (e.g., a mouse, a pointing device, pen and tablet, touch screen, multi-touch device, etc.) and a printer 128.

In one or more embodiments, computer 102 may be coupled to, or may comprise, a portable or media viewing/listening device 132 (e.g., an MP3 player, iPod™, Nook™, portable digital video player, cellular device, personal digital assistant, etc.).

In addition, computer 102 may be coupled to or may be integrated with an image capture device 134 (e.g., a camera, ultrasound, radar, x-ray, charge coupled device (CCD), complimentary metal oxide semiconductor (CMOS) device, or any device that is capable of capturing or generating an image of a real-world object). For example, many modern mobile phones and tablet devices may have a built in camera (e.g., lens) and other capabilities that enables the user to snap a picture/photograph.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Further, as described above, such multi-touch devices may also include a camera or the ability to capture an image of a desired object/scene. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communication devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Figure 2:
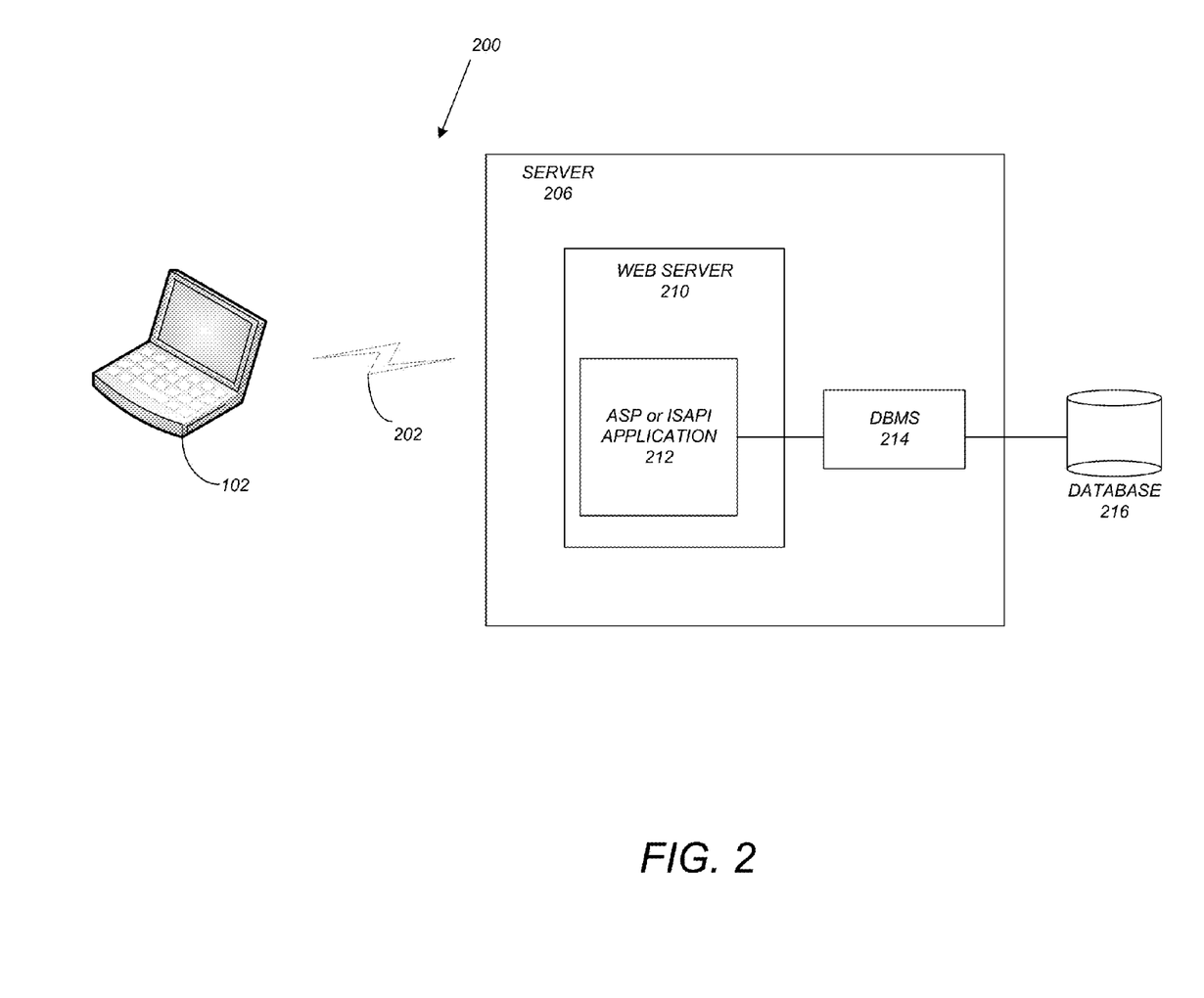
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 102 may be downloaded from server computer 206 to client computers 102 and installed as a plug-in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNENT INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include thin client devices with limited or full processing capabilities, portable devices such as cell phones, notebook computers, pocket computers, multi-touch devices, and/or any other device with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application on a client 102 or server computer 206. Further, as described above, the client 102 or server computer 206 may comprise a thin client device or a portable device that has a multi-touch-based display and/or image capture functionality/capability.

Embodiments of the invention provide a unique experience for solving the prior art problems by leveraging the native hardware on any camera enabled mobile device. Using the methodology described herein, a user may take a mobile device into the field, take a snapshot of the item he/she desires to design on (e.g., the tugboat from the example described above) or replicate (e.g., a mechanism from a design book). Alternatively, the user may merely select an existing image (e.g., from a gallery of pictures the user [or another user] has taken, and/or received from a library of images that are of real world objects/scenes or created in a modeling environment). The retrieved/selected image is then used as a background image for a free body diagram (i.e., created by the user). In this regard, the level of transparency of the background image may also be adjusted in order to enable the user to accurately create a free-body diagram that is integrated with the image in a two-dimensional (2D) or three-dimensional (3D) environment. Note that rather than an image, an existing model, or 3D image may also be utilized as the background image.

Thereafter, the engineer physically measures one object that is in the photograph and embodiments of the invention scale the free body diagram and all of the resulting calculations using this single real scaled item in the scene. This allows the user to draw the free body and apply a global scale to the free body after it is created so that the scale matches the size of the objects in the photograph. Since most of the static calculations on a free body diagram are impacted by the length of the elements used in the diagram, the automatic scaling helps to ensure the calculated results match the real world scenario.

In view of the above, embodiments of the invention provide the ability for a user to capture an image with a device (e.g., cellular phone, multi-touch device, etc. and then use directly on such a device or transfer the image to a device capable of executing the software to perform the functionality described herein) or use an existing image (as demonstrated in the workflow below), and scale the diagram and calculations to match the actual scale of the object the user took of the photo. Such a capability is critical as the scaled length of members can impact the calculation results. Accordingly, embodiments of the invention provide a unique approach that allows a user to take any measured length from the real world (that was captured in the image) and use that as a reference length that scales the rest of the diagram to match. Described below are the steps and an example for using this capability.

Figure 3:
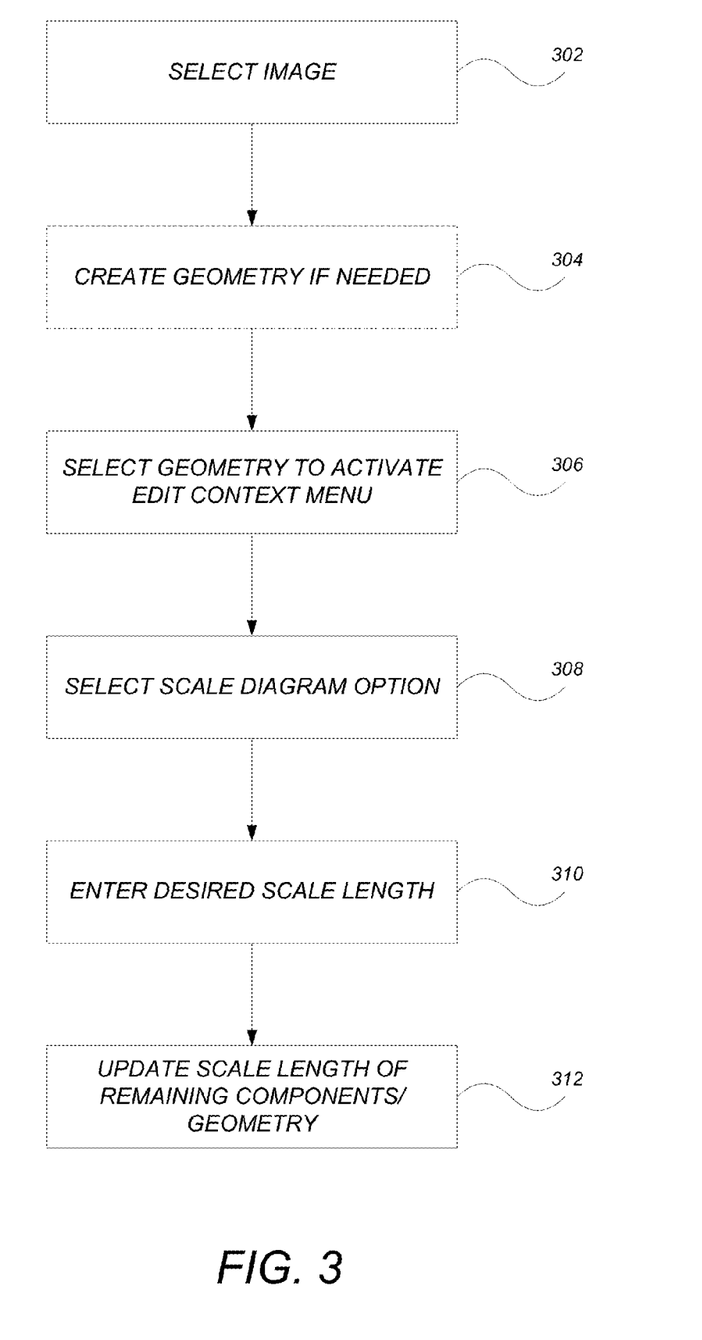
FIG. 3 illustrates the logical flow for utilizing the scale diagram feature in accordance with one or more embodiments of the invention.
Figure 4:
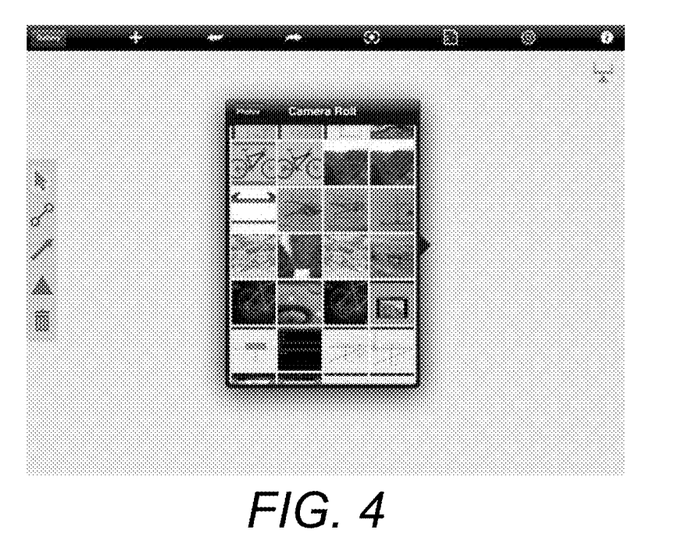
FIGS. 4-9 are sample screen shots of the graphical user interface viewed during the steps of FIG. 3 in accordance with one or more embodiments of the invention.

FIG. 3 illustrates the logical flow for utilizing the scale diagram feature in accordance with one or more embodiments of the invention. FIGS. 4-9 are sample screen shots of the graphical user interface viewed during the steps of FIG. 3.

At step 302, an image is selected (e.g., from a photo gallery on a thin client device or any type of computer). Such a gallery is displayed in FIG. 4. Note that as described above, the gallery may consist of photographs the user has taken, images the user has created, and/or images/photographs that the user is retrieved/obtained from another location (e.g., an online gallery, emailed from another user, etc.). Step 302 may also include utilize the selected image as a background image.

Figure 6:
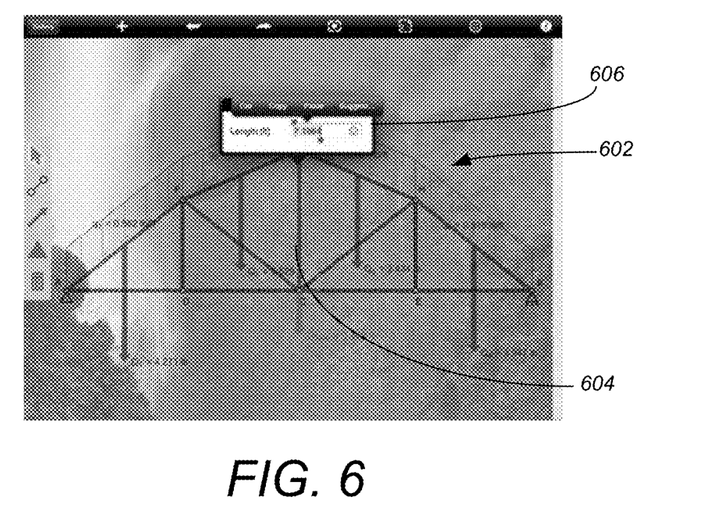

At step 304, the user creates geometry on the background image if necessary. In this regard, the user may draw reference lines, symbols, shapes, etc. that may (or may not) be overlayed on the background image. FIG. 6 illustrates a completed structure 602 that has been drawn on top of the background image. Alternatively, the geometry may already be created or may be part of the image that was selected. In this regard, step 304 may also include the obtaining of geometry (also referred to as "full geometry") that is displayed with the background image. The full geometry consists of a first geometry and remaining second geometry.

Returning to FIG. 5, the user can use any geometry (e.g., the first geometry) in the sketch as a reference line to scale the diagram. In this regard, the user can simply enter the edit mode (e.g., selecting arrow 502) followed by picking and holding the cursor on the reference line 504 (at step 306— selecting the geometry [e.g., the first geometry] to activate the edit context menu) to bring up a circular context menu 506. The user can then select the "Scale Diagram" option 508 from the context menu 506 (i.e., step 308).

Figure 5:
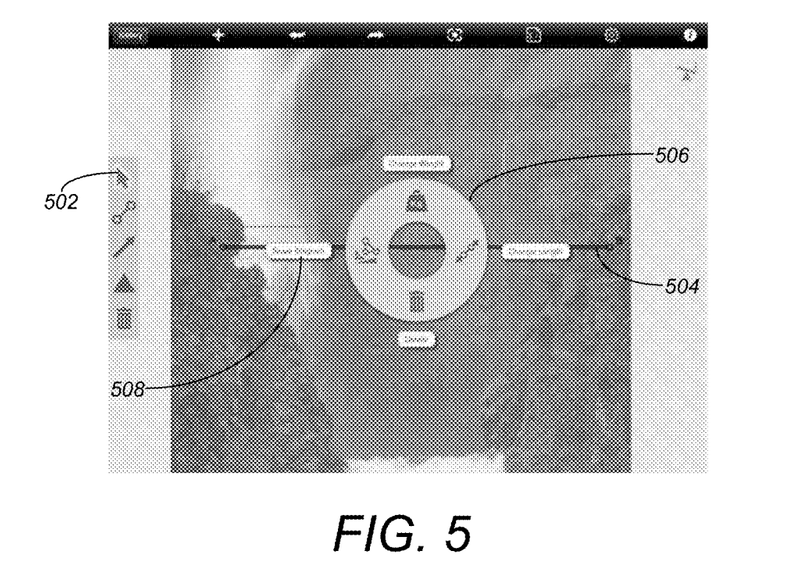

In an exemplary case as illustrated in FIG. 5, the user has imported/selected a background image of a waterfall and river that flows between two ridges (at step 302). As can be seen in FIG. 6, the user has drawn (i.e., at step 304) a full structure 602 (i.e., a bridge) with loads and supports.

The user notices that the length of the center element 604 of structure 602 is not correct as the user knows the physical height of the member 604 that will be used. The user desires to utilize this element 604 as the diagram scale reference geometry. Accordingly, the user selects the element 604, activates the edit context menu 506, and selects the scale diagram option 508 (i.e., at steps 306 and 308). Once the scale diagram option 508 has been activated with respect to a particular reference geometry (e.g., line 604), the dialog window 606 is presented to the user with the current length displaying within the text box of window 606. Such a dialog window 606 allows the user to enter the new "actual" length of the line 604 in the real world at step 310. Accordingly, the user may enter 25 feet as the actual length of member 604. In this regard, step 310 enables the user to specify a reference length for the selected geometry.

Figure 7:
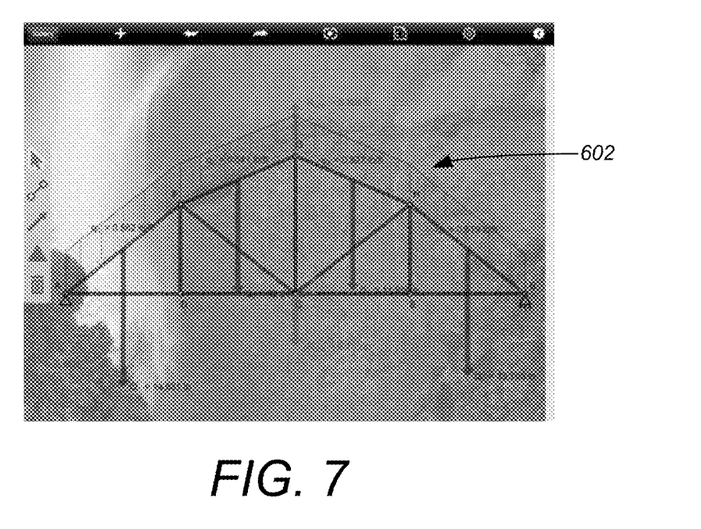

Thereafter, at step 312, the entire diagram (e.g., any remaining geometry) is scaled to match that (specified/entered) reference geometry length. FIG. 7 illustrates the resulting structure 602 once all of the components have been scaled based on the entry in FIG. 6. All of the updated scale values may be displayed (if desired) to the user via dimensions/dimension labels displayed for each of the geometric components.

Figure 8:
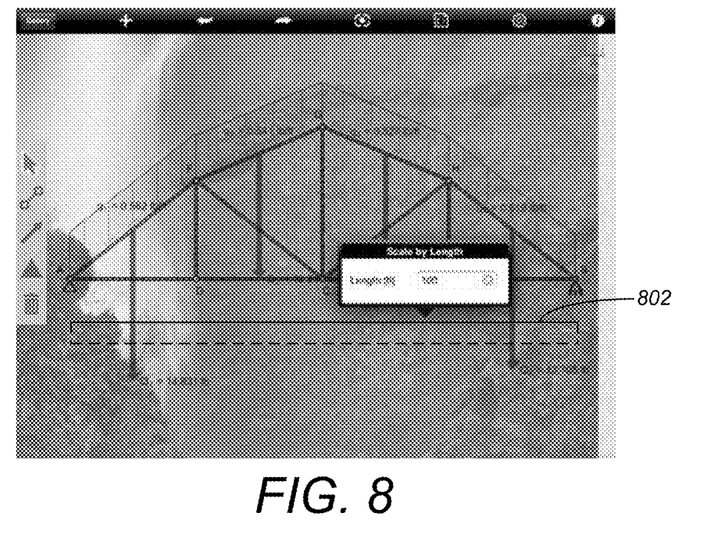
Figure 9:
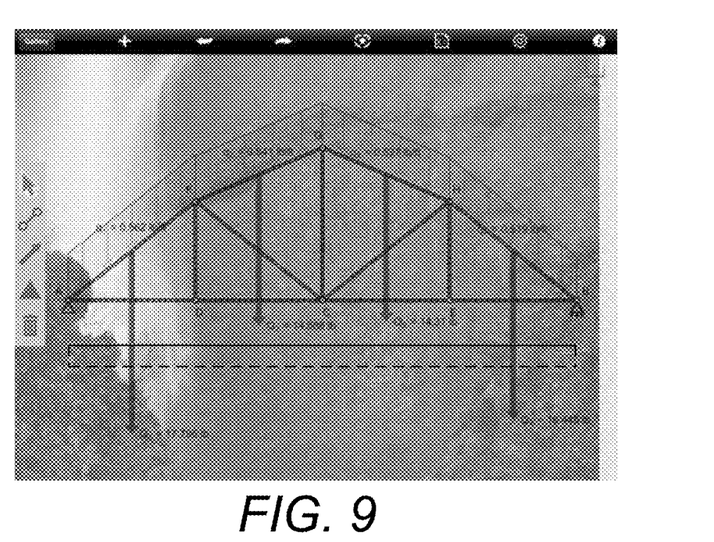

In another workflow, the user can create a new reference line that can then be deleted from the diagram once the diagram is properly scaled. In such an example, the user knows the distance across the gulley is 100 feet. Accordingly, the user may draw a reference line on the diagram, use that as the scale line, and set its length to 100 feet as illustrated in FIGS. 8 and 9. Thereafter, the user can delete the reference line and the rest of the diagram will maintain the new scale factor moving forward.

In addition to the above, at step 302, the user may have the ability to utilize the invention in a 3D modeling application. For example, if the user has two (2) buildings and was building a tunnel between them, the user could add the dimension, ask for models of the two buildings so that the link would be between two physical models and not merely a background image (i.e., it would be an actual 3D model of the real-world environment). Thus, the user could select a 3D model rather than an image at step 302. Alternatively, a 2D image could be selected but converted into a 3D model either automatically by the application or by the user. In yet another embodiment, the background image is used as a single viewpoint of a 3D model and the user creates geometry (at step 304) in a 3D modeling environment using the background image as a base.

Further, embodiments of the invention may have the ability to pull in satellite images (as the background images) based on GPS (global positioning system). In other words, a user with a GPS enabled device may be at a particular location (e.g., of the gulley illustrated in FIGS. 4-9). The user can simply utilize already existing satellite images of the gulley that are easily retrieved into the device based on the GPS data. The user can then zoom in as much as desired and specify an actual measurement by drawing on top of the satellite image. In this regard, the user can zoom into a location adjacent to where he/she is standing, draw a reference line for a tree or rock, enter the appropriate dimension, scale the drawing appropriately, and then zoom out to draw the remaining bridge components (e.g., supports, bars, etc.). Note that the same concept with the zooming may be used in the other embodiments described above (i.e., with images captured by the device itself).

It may be noted that step 312 may be performed in a variety of ways. In one example, the user input is received for a scale length of a first selected element ("A") in a free body diagram (FBD). Thereafter, for each remaining element ("B") in the FBD, a ratio is determined and then used to adjust the scale size/length of the element B. For example, the ratio may comprise:

$$\frac{FBD \text{ Size/Length of Element } A}{FBD \text{ Size/Length of Element } B}$$

To utilize the ratio to adjust the scale size of element B based on the input scale size/length, the following calculation may be performed:

$$\frac{FBD \text{ Size/Length of Element } A}{FBD \text{ Size/Length of Element } B} = \frac{\text{Input Scale Size/Length of Element } A}{X \text{ Scale Size/Length of Element } B}$$

Using such an equation, the system simply calculates "X" based on the ratio and input scale size/length. Such a computation is performed for every geometric element in the drawing.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to take a picture and scale a free body diagram to the image/picture. As a result, the user is ensured of an accurate static calculation result for a desired/particular scenario. Such a result further enables the engineer to build a diagram sketch without concern over size or scale until the engineer desires to run the calculations. The engineer can scale an entire diagram with one simple command and the calculations and sketch dimensions are automatically scaled (i.e., without additional user input) using this scale factor.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for scaling a diagram comprising:
    selecting an image on a thin client device;
    utilizing the image as a background image;
    obtaining a free body diagram on the thin client device, wherein the free body diagram comprises full geometry that is displayed with the background image, wherein the full geometry comprises a first geometry and remaining second geometry;
    selecting the first geometry on the thin client device;
    specifying a reference length for the selected first geometry on the thin client device; and
    scaling the remaining second geometry in the diagram based on the specified reference length.

2. The computer-implemented method of claim 1, wherein the image is selected from a photo gallery on the thin client device.

3. The computer-implemented method of claim 1, wherein the image comprises a three-dimensional (3D) model.

4. The computer-implemented method of claim 1, wherein the image comprises a satellite image based on global positioning system (GPS).

5. The computer-implemented method of claim 1, wherein the first geometry and the remaining second geometry is overlaid on top of the background image.

6. The computer-implemented method of claim 1, further comprising accepting user input creating the free body diagram on the thin client device.

7. The computer-implemented method of claim 1, wherein the selecting the first geometry comprises:
    selecting the first geometry to activate an edit context menu; and
    selecting an option to scale the diagram from the edit context menu.

8. The computer-implemented method of claim 7, wherein the specifying the reference length comprises:
    displaying a dialog window, wherein the dialog window accepts user input specifying the reference length for the selected first geometry.

9. The computer-implemented method of claim 1, further comprising displaying dimension labels based on the scaled remaining second geometry and the first geometry.

10. The computer-implemented method of claim 1, wherein:
    the obtaining the full geometry comprises creating the first geometry as a new reference line; and
    the first geometry is deleted once the remaining second geometry is scaled.

11. A non-transitory computer readable storage medium encoded with computer program instructions which when accessed by a computer cause the computer to load the program instructions to a memory therein creating a special purpose data structure causing the computer to operate as a specially programmed computer, executing a method of scaling a diagram, comprising:
    selecting, in the specially programmed computer comprising a thin client device, an image;
    utilizing, in the specially programmed computer, the image as a background image;
    obtaining, in the specially programmed computer, a free body diagram comprising full geometry that is displayed with the background image, wherein the full geometry comprises a first geometry and remaining second geometry;
    selecting, in the specially programmed computer, the first geometry;
    specifying, in the specially programmed computer, a reference length for the selected first geometry; and
    scaling, in the specially programmed computer, the remaining second geometry in the diagram based on the specified reference length.

12. The computer readable storage medium of claim 11, wherein the image is selected from a photo gallery on the thin client device.

13. The computer readable storage medium of claim 11, wherein the image comprises a three-dimensional (3D) model.

14. The computer readable storage medium of claim 11, wherein the image comprises a satellite image based on global positioning system (GPS).

15. The computer readable storage medium of claim 11, wherein the first geometry and the remaining second geometry is overlaid on top of the background image.

16. The computer readable storage medium of claim 11, further comprising accepting user input creating the free body diagram on the thin client device.

17. The computer readable storage medium of claim 11, wherein the selecting the first geometry comprises:
    selecting the first geometry to activate an edit context menu; and
    selecting an option to scale the diagram from the edit context menu.

18. The computer readable storage medium of claim 17, wherein the specifying the reference length comprises:
    displaying a dialog window, wherein the dialog window accepts user input specifying the reference length for the selected first geometry.

19. The computer readable storage medium of claim 11, further comprising displaying dimension labels based on the scaled remaining second geometry and the first geometry.

20. The computer readable storage medium of claim 11, wherein:
    the obtaining the full geometry comprises creating the first geometry as a new reference line; and
    the first geometry is deleted once the remaining second geometry is scaled.

* * * * *